Sept. 3, 1963   B. HASKELL ETAL   3,102,970
IMPEDANCE NETWORKS AND DISPLAY PANELS UTILIZING THE NETWORKS
Filed Oct. 3, 1960   4 Sheets-Sheet 1
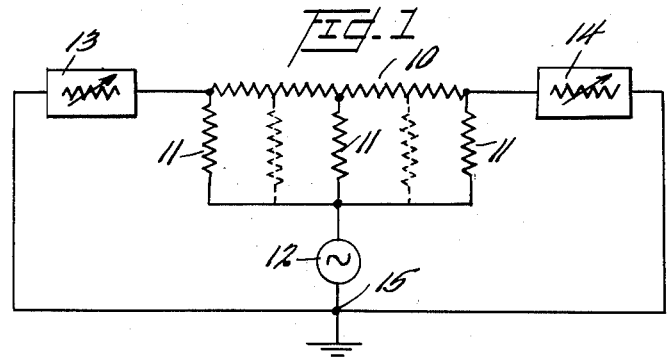
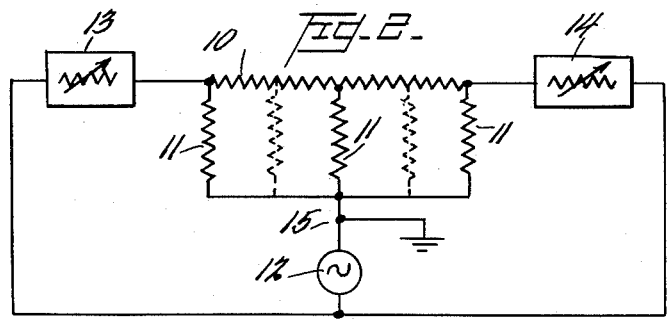
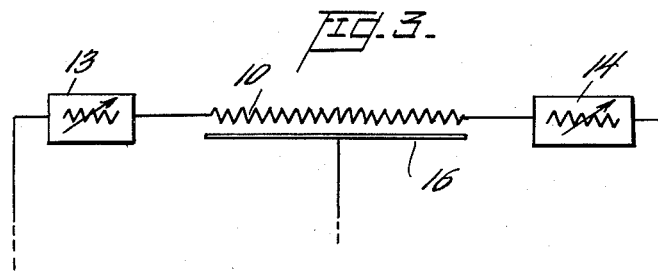
INVENTORS
Boris Haskell
George Eden,
BY Paris, Haskell + Levine
ATTORNEYS Sept. 3, 1963    B. HASKELL ETAL    3,102,970
IMPEDANCE NETWORKS AND DISPLAY PANELS UTILIZING THE NETWORKS
Filed Oct. 3, 1960    4 Sheets-Sheet 2
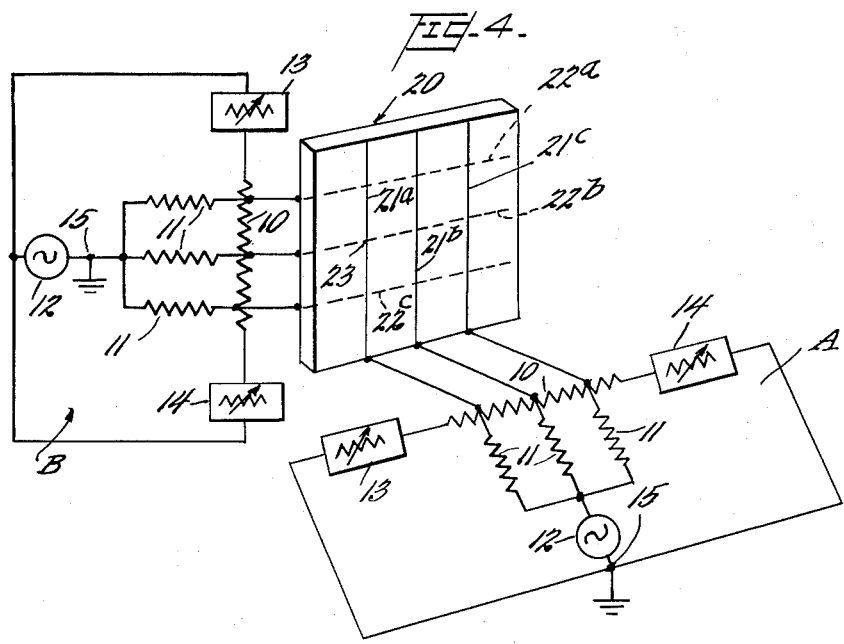
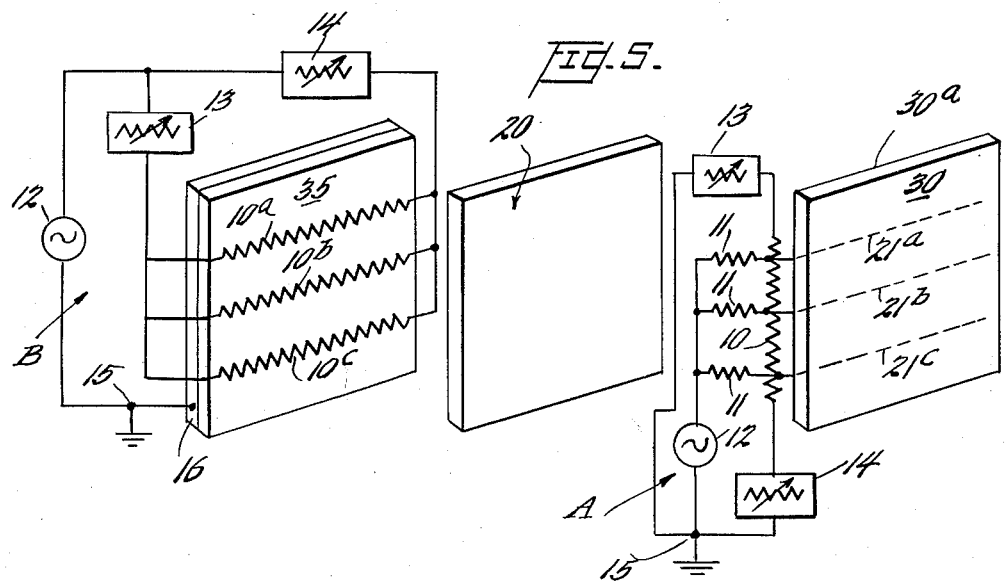
INVENTORS
Boris Haskell
George Edlen,
BY Paris, Haskell & Levine
ATTORNEYS

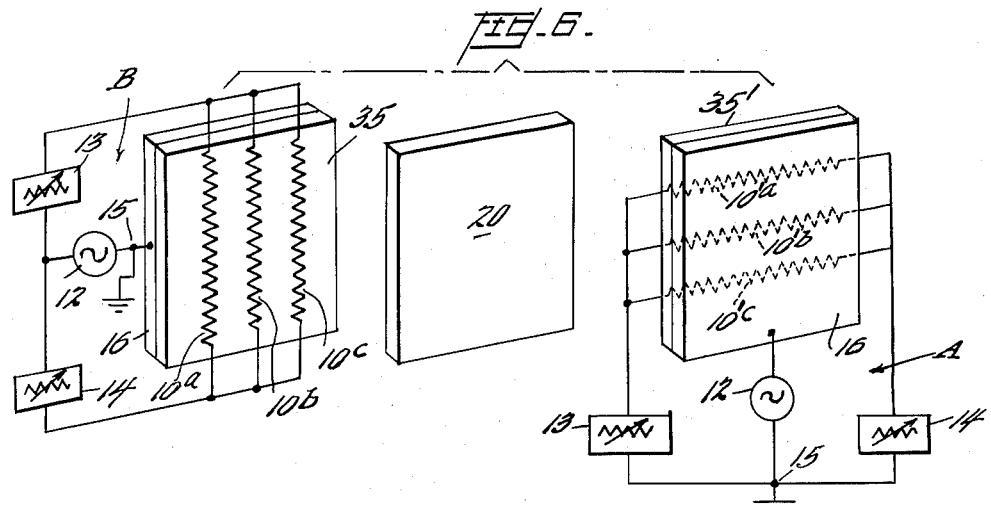
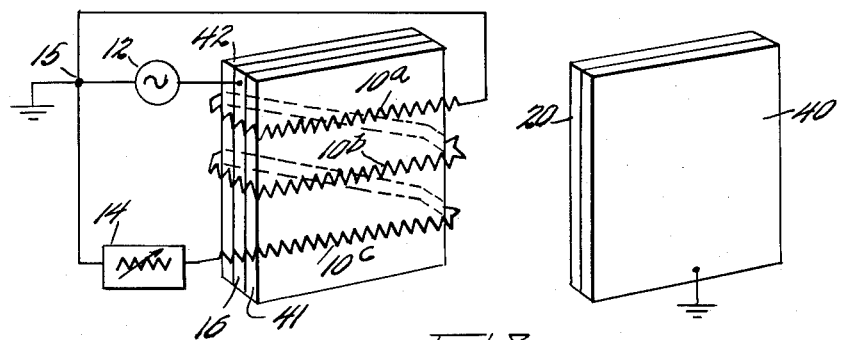
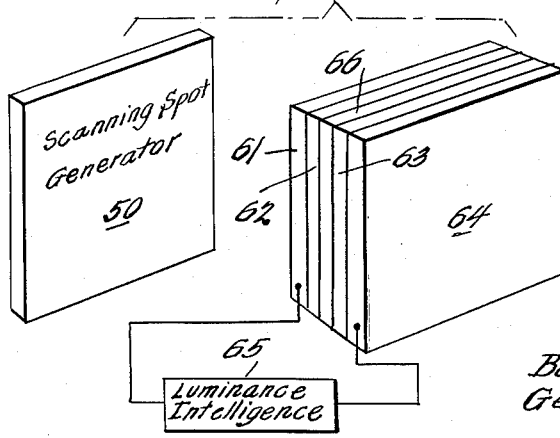
INVENTORS
Boris Haskell
George Eden,
BY Paris Haskell & Levine
ATTORNEYS Sept. 3, 1963 B. HASKELL ETAL 3,102,970
IMPEDANCE NETWORKS AND DISPLAY PANELS UTILIZING THE NETWORKS
Filed Oct. 3, 1960 4 Sheets-Sheet 4
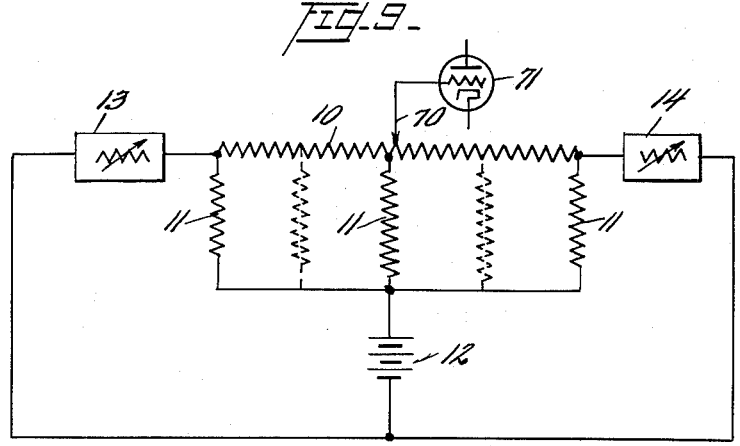
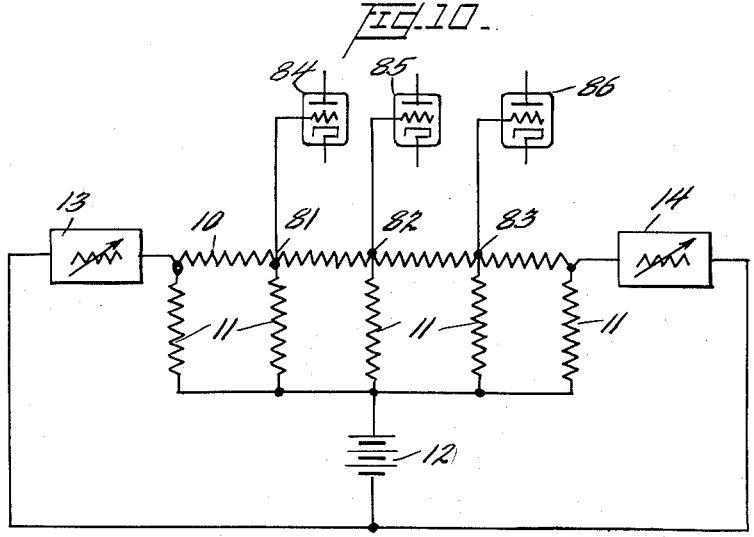
INVENTORS
*Boris Haskell*
*George Eden*
BY *Paris, Haskell + Levine*
ATTORNEYS

United States Patent Office 3,102,970
Patented Sept. 3, 1963

3,102,970
IMPEDANCE NETWORKS AND DISPLAY PANELS
UTILIZING THE NETWORKS
Boris Haskell, 3715 Underwood St., Chevy Chase, Md.,
and George Edlen, 65 Morningside Drive, Ossining,
N.Y.
Filed Oct. 3, 1960, Ser. No. 60,216
41 Claims. (Cl. 315—153)

The present invention relates to impedance networks, and to display panels utilizing such networks for the purpose of presenting electrically carried intelligence in visual or other form. The networks of the present invention are adapted to commutate or gate the incoming electrical intelligence to selected or various areas of the panel in accordance with a prescribed or desired commutation or gating pattern, in order to present the electrical information in intelligible visual form or other form adapted for display. Accordingly, the impedance networks may themselves be considered as commutating or gating circuits for general purposes other than display panels.

With respect to the display panels, it is contemplated that the present commutating or gating impedance networks may be particularly advantageously used for scanning electroluminescent display panels, although the present invention is not limited to such specific panels. Electroluminescent panels adapted to emit light in response to a varying electrical field applied thereacross are well known, and are exemplified by such U.S. Patents as 2,728,870 to W. C. Gungle et al., and 2,624,857 to E. L. Nager. In addition, it has been recognized that if an intelligence bearing electrical signal is applied across localized areas of an electroluminescent panel in accordance with a prescribed scan pattern, the electrical intelligence can be converted into an intelligible visual light output of the panel. A primary problem in this regard is obtaining a practical means and method for effecting a controlled and predetermined scanning pattern for the electroluminescent panel. The prevalent prior art approach to scanning such a panel is based upon sandwiching the electroluminescent phosphor panel between two conductive grids. A first grid of parallel conductors is placed on one surface of the panel, and a second grid of parallel conductors is placed on the opposite surface of the panel. These grids are further arranged to lie at right angles to each other, and thus provide a pattern of intersecting points. It is apparent that these intersection points can be selectively energized by selectively applying a potential across the two conductors that form the particular intersection. Appropriate selective energization of the grid conductors can thus provide a desired pattern of scan. One prior art method of effecting this selective energization of the grid conductors is to associate a conventional commutator with each grid, as exemplified in U.S. Patent 2,698,915 to W. W. Piper. A second prior art approach is to associate a delay line with each grid, so that a pulse applied to one end of the line sequentially energizes each of the grid conductors associated therewith, as exemplified in U.S. Patent 2,818,531 to S. C. Peek, Jr.

The conventional commutator approach has the obvious disadvantage of a rather cumbersome device, particularly where each grid comprises a large number of conductors. The delay line approach suffers from the disadvantage of requiring a very long delay line if the field of scan is to span any appreciable length of time, as well as from the problem of attenuation of the pulse as it travels down the line. The present invention overcomes the foregoing disadvantages, and provides a simple and effective approach to scanning an electroluminescent panel by means of a novel impedance network adapted to function as an electrical commutator or gating circuit for the panel. Further, whereas the foregoing prior art approaches are inherently limited to scanning on a fixed pattern in accordance with the precise pattern designed into the structure of the system, in accordance with some embodiments of the present invention, the scan pattern may be altered at will by merely changing an electrical input to the scanning system. As a result, the electroluminescent display panels of the present invention take on the characteristics of a true oscilloscope, and may be used to trace the voltage characteristics, for example, of an input signal, as well as to effect a visual presentation of electrically carried intelligence on the basis of a prescribed pattern of scan properly referenced to the pattern of application of electrical intelligence.

Since the novel impedance networks of the present invention function as commutating or gating circuits in scanning the electroluminescent display panel, it is apparent that these networks can function as electrical commutators or gating circuits in general, for purposes other than scanning such display panels. Accordingly, the present invention contemplates these general commutating and gating functions of the impedance networks, as well as other functions and uses to which these novel networks may be put, as will be apparent to those skilled in the art.

It is therefore one object of the present invention to provide display panels, and particularly electroluminescent display panels.

Another object of the present invention is to provide for scanning such panels.

Another object of the present invention is to provide for scanning such panels in accordance with a prescribed pattern of scan.

Another object of the present invention is to provide for such a prescribed pattern of scan and for developing a visual presentation of electrically carried intelligence properly referenced to said pattern of scan.

Another object of the present invention is to provide for scanning display panels, and particularly electroluminescent panels, wherein the pattern of scan is a function of the characteristics of an applied electrical value, and may be a function of applied voltage values.

Still another object of the present invention is to provide novel impedance networks, particularly adapted to function as electrical commutating and gating circuits, and to perform other functions not normally attributable to impedance networks.

Other objects and advantages of the present invention will become apparent to those skilled in the art from a consideration of the following description of several exemplary specific embodiments of the present invention had in conjunction with the accompanying drawings, in which like numerals refer to like or corresponding parts, and wherein:

FIG. 1 is a schematic diagram of an electrical impedance network forming a basic component of the present invention;

FIG. 2 is a schematic diagram of a second electrical impedance network also forming a basic component of the present invention;

FIG. 3 is a partial schematic diagram of a modification of the basic impedance networks shown in FIGS. 1 and 2;

FIG. 4 is a schematic diagram of an electroluminescent display panel embodying one form of the present invention;

FIGS. 5, 6, and 7 are schematic diagrams of electroluminescent display panels embodying additional forms of the present invention, and are shown with different sections separated for purposes of illustration and to facilitate illustration thereof, although in actual practice the separated sections would be superposed on each other in the sequence shown to form integral multi-layered panels;

FIG. 8 illustrates a form of the invention for improving luminance intelligence display in conjunction with scanning devices of the present invention;

FIG. 9 is a schematic diagram of the basic impedance network as embodied in FIGS. 1–3 employed in a circuit adapted to perform a general gating function; and FIG. 10 is a schematic diagram of the basic impedance network as embodied in FIGS. 1–3 employed in a circuit adapted to perform a general commutating function.

Before describing the present invention in relation to electroluminescent display panels, attention will first be given to the basic impedance networks of the invention schematically shown in FIGS. 1, 2, and 3. In FIGS. 1 and 2, a voltage source 12 is shown coupled to a resistor 10 through a plurality of parallel resistors 11, the resistors 11 being coupled to spaced points along the length of resistor 10, thus forming a resistance coupling to resistor 10 distributed along the length thereof. Any desired number of resistors 11 may be employed, three being shown for purposes of illustration. To the ends of resistor 10 are coupled variable impedances 13 and 14, which may for example be impedances variable mechanically, such as potentiometers, or impedances variable electrically, such as impedance vacuum tube circuits, or variable voltage sources bucking source 12 and effectively operating as variable impedances. The variable impedance devices 13, 14 are in turn coupled together and to the source 12 to complete the circuit. Structurally the circuits of FIGS. 1 and 2 are identical. In FIG. 1 however the connection between the variable impedances 13, 14 and the source 12 is indicated as grounded at 15, while in FIG. 2 the opposite or other side of the source 12 is indicated as grounded at 15.

In FIG. 1, if the impedances 13 and 14 are equal, the voltage distribution on resistor 10 has a maximum value with reference to ground 15 at the center, and diminishes toward either end of the resistor 10. If the impedance of 13 is increased and that of 14 decreased, this maximum voltage point on resistor 10 moves to the left. Similarly, if the impedance of 14 is increased and 13 is decreased, the maximum voltage point on resistor 10 moves to the right. Thus, the maximum voltage point on resistor 10 can be caused to move therealong in accordance with the variations in impedance values of variable impedance units 13 and 14. If desired, the impedance values of this network can be readily chosen so that if the increase in impedance of one unit 13 or 14 is balanced by a corresponding decrease in impedance of the other unit, the value of the voltage of the moving maximum point remains constant for a constant output from source 12, for each instance that this maximum is at a junction of one of the resistors 11 with resistor 10.

This movement of the maximum voltage point along resistor 10 is caused by a shift in the impedance value of one side of the network relative to the other, thereby causing a shift in the impedance midpoint of the network as related to the length of elongate resistor 10. Since it is only the voltage distribution along resistor 10 that is of concern, this impedance midpoint (the impedance midpoint of the network relative to the physical dimension of the network related to the length of elongate resistor 10) is referred to herein as the "effective impedance midpoint" of the network. I.e., by the expression "effective impedance midpoint" of the network, it is meant herein and in the appended claims that point along resistor 10 where the maximum voltage point exists.

The operation of the FIG. 2 circuit is exactly the same as the FIG. 1 circuit, except that the maximum voltage point of FIG. 1 is replaced by a minimum voltage point with reference to ground 15 in FIG. 2 that may be caused to traverse resistor 10 in the same manner and under the same conditions as discussed above with reference to FIG. 1. Of course, the term "effective impedance midpoint" of the network applied to FIG. 2 refers to the point along resistor 10 having the minimum voltage value.

FIG. 3 embodies a modification of FIGS. 1 and 2, in that instead of coupling the source 12 to resistor 10 by a network of resistors 11, a similar effect may be obtained by coupling through a capacitive effect, wherein the voltage source is connected to a conductive plate 16 capacitively coupled to resistor 10 along its length, said resistor 10 forming the second plate of the capacitor. In FIG. 3, only resistor 10, coupling 16, and variable impedances 13 and 14 are shown, it being understood that plate 16 is coupled to one side of the voltage source, and units 13 and 14 are further coupled to each other and to the other side of the voltage source, as in FIGS. 1 and 2. The ground reference of this circuit may be had either in accordance with that of FIG. 1 or FIG. 2, depending upon whether one desires a traversing voltage maximum or voltage minimum along resistor 10.

In the foregoing networks of FIGS. 1–3, it will be appreciated that since variable impedance units 13 and 14 may take on numerous forms, as for example impedance vacuum tube circuits or variable voltage sources of diverse types functioning effectively as variable impedances, the impedance values of these units may be readily varied in accordance with the value of an incoming or applied signal, as for example, a voltage signal. As the maximum or minimum voltage point on resistor 10 is thus caused to move, the unit broadly constitutes a means for converting the value of an applied signal (i.e. the signal applied to control the impedance values of units 13 and 14) into a spatial displacement related to the value of said applied signal. This phenomenon may be employed for many purposes, and one purpose is to effect a spatial commutating, selecting, or energizing function along the length of resistor 10, and such function may be employed for the purposes of scanning a crossed grid electroluminescent screen as illustrated in FIG. 4.

In FIG. 4, numeral 20 designates a conventional electroluminescent panel comprising suitable electroluminescent phosphor materials embedded in a dielectric base. A first grid 21 of parallel conductors 21a, 21b, and 21c is applied to one surface of the panel 20; and a second grid 22 of parallel conductors 22a, 22b, and 22c running at right angles to the conductors of the first grid 21 is applied to the opposite surface of the panel. The properties of electroluminescent phosphors include the emission of light in an area where a varying electrical field, such as an A.C. voltage, is applied thereacross. Additionally, these phosphors possess what is termed a threshold voltage; i.e. they do not luminesce or emit any appreciable light unless the voltage of the varying field applied thereacross exceeds a certain minimum value. Thus, if A.C. voltages are applied to conductors 21a and 22b, for example, so that the potential difference therebetween exceeds the threshold value for the panel 20, the intersection point 23 of these conductors is caused to luminesce and produce a light spot; and if the potential differences between the other intersecting conductors of the grids are all below this threshold value, point 23 is the only point on the panel 20 that emits any appreciable light. It is therefore apparent that by appropriate control of the voltages on the grid conductors, a light spot may be caused to traverse the panel 20 in a predetermined pattern of scan, or in accordance with a particular function.

To this end, a scanning circuit A as shown in FIG. 1 is connected to the conductors of grid 21, and a scanning circuit B as shown in FIG. 2 is connected to the conductors of grid 22. These grid conductors are connected to spaced points along their respective resistors 10, and preferably connected to those points along resistors 10 to which the resistors 11 are coupled. By appropriate control of variable impedance units 13 and 14, a maximum voltage value can be applied to each of the conductors of grid 21 in sequence, while a minimum voltage value can be applied to each of the conductors of grid 22 in sequence. In this manner selected points of intersection between the conductors of grid 21 and the conductors of grid 22 can be caused to luminesce in sequence in accordance with a desired pattern of scan, or in accordance with an applied function.

For example, a repetitive sawtooth input signal can be applied to units 13 and 14 of scanning circuit A to cause their impedances to correspondingly vary and thus cause the point of maximum voltage on resistor 10 of this circuit to move from left to right along the resistor 10 in repetitive synchronism with the input signal. This causes grid conductors 21a, 21b, and 21c to attain said maximum voltage value sequentially and repetitively. Simultaneously, a step function input signal can be applied to units 13 and 14 of scanning circuit B, to cause their impedances to correspondingly vary and thus cause the point of minimum voltage on resistor 10 of this circuit to move from top to bottom stepwise along the resistor 10 in synchronism with this input signal. This causes grid conductors 22a, 22b and 22c to attain said minimum voltage value sequentially. The voltage values of sources 12 can be readily chosen so that substantially only the minimum voltage value on resistor 10 of scanning circuit B and the maximum voltage value on resistor 10 of scanning circuit A together embody a sufficient potential difference to exceed the threshold value of the panel 20. Under this condition, and with the foregoing input signals applied to the units 13 and 14 of the two circuits A and B properly synchronized with each other, a pattern of scan is obtained wherein: first conductor 22a obtains a minimum voltage while conductors 21a, 21b, and 21c in sequence obtain a maximum voltage, then conductor 22b obtains a minimum voltage while conductors 21a, 21b and 22c in sequence again obtain a maximum voltage, then conductor 22c obtains a minimum voltage while conductors 21a, 21b, and 21c in sequence again obtain a maximum voltage. By the foregoing operation one obtains a scanning light spot output from panel 20 which scans across the panel line by line. By using two interlaced grids 22 each associated with its own scanning circuit B, it will be apparent to those skilled in the art that one can readily effect an interlaced pattern of line by line scan. If the foregoing scan pattern is employed, one may desire to impress upon the scan pattern some intelligence in terms of luminescent intensity of the scanning spot to obtain a luminance presentation of intelligence. This may be done by varying or modulating the voltage output of either or both sources 12, and thus varying the potential difference between the maximum and minimum voltages on resistors 10, and hence the instantaneous intensity of the scanning light spot. Through visual and phosphor retention, it is possible to obtain a visual intelligence display embracing the entire panel 20. The foregoing suggested modulation of the voltage sources 12 as the means of obtaining luminance intelligence may be employed, but it is not considered the preferred mode of obtaining this result. The preferred mode of obtaining a luminance display of intelligence will be described subsequently.

In addition to obtaining the foregoing line by line pattern of scan, the embodiment of FIG. 4 can be used to display a function, i.e. the system can be used to scan or provide a trace in accordance with numerous applied functions, in much the same manner as a conventional oscilloscope. For example, a repetitive sawtooth input signal can be applied to units 13 and 14 of scanning circuit A in the same manner as above, to produce a repetitive horizontal scan in synchronism with this input signal. While any input signal can be applied to units 13 and 14 of vertical scanning circuit B to vary their effective impedances to their source 12, and hence vary the position of the minimum voltage point along the circuit B resistor 10 in accordance with and in synchronism with the function of this input signal. As in a conventional oscilloscope, if the input signals to circuits A and B are all properly synchronized, one obtains a trace on panel 20 whose vertical displacements correspond to the value of the input signal applied to circuit B along the time base provided by the horizontal scan output of circuit A.

In actual construction of the system of FIG. 4, it is preferred that the phosphor panel 20 be sandwiched between two supporting panels made of insulating material, and at least one of which, the front one, should be of a transparent material such as glass. The grids 21 and 22 are applied to these supporting panels by printed circuit techniques, and that grid formed on the front transparent panel is formed preferably as transparent conductors. Similarly, it is preferred that the resistance networks 10 and 11 and their connections to the grids be printed circuits formed on portions of the supporting panels extending or overhanging beyond the phosphor panel. It is also understood that the three conductor grids shown in the drawings are only for purposes of illustration, and that many more conductors may be employed for each grid.

Another embodiment of the invention is shown in FIG. 5. Here the grid 21 is shown applied to surface 30a of a transparent insulator 30, such as glass. The grid conductors 21a, 21b, and 21c are preferably transparent conductors, and are shown to extend horizontally across the transparent panel 30. A scanning circuit A, identical to that described for FIG. 4, and comprising the resistors 10 and 11, variable impedance units 13 and 14, voltage source 12, and ground connection 15, is coupled to the grid conductors to cause a peak voltage value on resistor 10 to be applied sequentially or selectively to the grid conductors. A second grid is applied to a dielectric panel 35, but in this instance the grid elements are composed of resistors 10a, 10b, and 10c, constituting parallel resistor elements of scanning circuit B, and corresponding to resistor 10 in FIGS. 1–3. These grid elements are also disposed horizontally. The scanning circuit B further comprises the variable impedance units 13 and 14, voltage source 12, plate 16 capacitively coupled to resistors 10a, 10b, and 10c (as in FIG. 3), and ground connection 15. In this instance, the minimum voltage point for resistor 10 in FIG. 3 appears on the corresponding points for all resistors 10a, 10b, and 10c in FIG. 5, and variations in the values of circuit B impedance units 13 and 14 cause these voltage minima to traverse simultaneously the resistors 10a, 10b, and 10c correspondingly. To complete the assembly, electroluminescent panel 20 is sandwiched between plates 30 and 35 with the grid elements in contact therewith. In assembly, grid conductor 21a is located directly opposite grid resistor 10a, grid conductor 21b is located directly opposite grid resistor 10b, and grid conductor 21c is located directly opposite grid resistor 10c.

When thus assembled, it will be apparent from the previous discussion that if a repetitive sawtooth input signal is applied to variable impedance units 13, 14 of circuit B, a minimum voltage value will be caused to scan repetitively across each of the grid elements 10a, 10b, and 10c simultaneously and in synchronism with the applied sawtooth input signal. This function may be considered, for purposes of example, to be the horizontal scan pattern. Similarly, grid 21 is scanned by circuit A to cause a maximum voltage value to appear selectively on conductors 21a, 21b, and 21c. For example, a step function input signal may be applied to circuit A variable impedance units 13, 14 bearing a time relation to the input of unit B such that: the maximum voltage value of unit A is applied to conductor 21a during the first sweep of minimum voltage across grid resistors 10a, 10b, and 10c, then to conductor 21b during the second sweep, then to conductor 21c during the third sweep. This input pattern to scanning circuits A and B results in a light spot output of electroluminescent panel 20 which effects a line by line traverse or scan of the screen or assembly, the instantaneous position of the light spot corresponding to the single point at which a maximum voltage on grid 21 overlies a minimum voltage on grid resistor 10a, 10b, or 10c.

Alternatively, scanning circuit B and grid resistors 10a, 10b, and 10c may provide the horizontal sweep above described, while any desired input function is applied to variable impedance units 13, 14 of vertical scanning circuit A. The light spot output of electroluminescent panel 20 will then provide a visual trace of the input to circuit A, with the vertical displacement of the spot providing a reading of the characteristic of the input signal along the time base provided by the horizontal scan of unit B.

As thus far described, the embodiment of FIG. 5 provides only a scanning pattern for the screen or assembly. Luminance intelligence may also be provided as a modulation of the output voltage of source 12 of either scanning circuit A or B, or both, although this is not the preferred mode of obtaining such intelligence. The preferred mode of obtaining luminance intelligence will be described subsequently.

The embodiment of the invention shown in FIG. 6 is quite similar to that shown in FIG. 5. The grid comprised of resistors 10a, 10b, and 10c, and its associated scanning circuit B is identical in construction and function to that for the resistor grid in FIG. 5, except that the grid resistors 10a, 10b, and 10c are disposed in FIG. 6 with their length dimensions running vertically instead of horizontally. Except for the fact that grid resistors 10'a, 10'b, and 10'c are disposed with their length dimensions running horizontally, this grid, its associated dielectric panel 35', its capacitor plate 16, and its associated scanning circuit A are substantially similar to vertically disposed grid 10a, 10b, and 10c and its associated scanning circuit B. The only difference between these grid circuits is the ground connections 15, to provide a scanning minimum voltage along grid resistors 10a, 10b, and 10c in response to variations in their variable impedance units 13 and 14, and to provide a scanning maximum voltage along grid resistors 10'a, 10'b, and 10'c in response to variations in their variable impedance units 13 and 14. When assembled the electroluminescent panel 20 is sandwiched between plates 35 and 35' with grid resistors 10a, 10b, and 10c in contact with one surface of the panel 20, and with grid resistors 10'a, 10'b, and 10'c in contact with the opposite surface of the panel 20.

From the previous descriptions, it is apparent that variations in the values of impedance units 13, 14 in scanning circuit A causes a maximum voltage to traverse along the length of grid resistors 10'a, and 10'b, and 10'c simultaneously; while variations in the values of impedance units 13, 14 in scanning circuit B causes a minimum voltage to traverse along the length of grid resistors 10a, 10b, and 10c simultaneously. With the several grid resistors 10 and 10' extending at right angles to each other and sandwiching electroluminescent panel 20 therebetween, it is apparent that a light spot pattern of scan over the pattern of grid intersection points will be obtained. This scanning pattern may be either a line by line scan, or may be in accordance with any other function, in the same manner as previously described. Also, by modulation of voltage sources 12, a luminance intelligence may be readily imposed on the scanning spot, if desired, although this is not the preferred mode of accomplishing a presentation of luminance intelligence, as will be subsequently described.

In each of the embodiments of FIGS. 4-6, the scanning circuits A and B are connected to provide a traversing maximum voltage on one circuit with a traversing minimum voltage on the other circuit. It is apparent that where desired the scanning circuits can be connected to both produce a traversing maximum provided the sources 12 of the two circuits are 180° out of phase. By this procedure, the voltage between the grids and across the electroluminescent panel is at a maximum in the area where the two maxima are opposite each other.

In each of the foregoing scanning spot assemblies or generators of FIGS. 4-6, the pattern of scan was free to assume any trace dictated by the input signals applied to the scanning circuit variable impedance units 13, 14. In the FIG. 7 embodiment, however, the pattern of scan is constrained to a prescribed configuration, and variations in the inputs to the variable impedance units can only affect the position of the scanning spot on the prescribed configuration or the rate at which it traverses that configuration. The FIG. 7 embodiment comprises a first panel subassembly of a plate 41 of dielectric material, a conductive capacitor plate 16 superposed on one surface of the dielectric plate, and an insulating and shielding plate 42 in turn superposed on the capacitor plate. Resistance wire 10 is wound on this subassembly as a mandrel, at all points separated from plate 16, in a configuration to provide the horizontal grid lines 10a, 10b, and 10c over the exposed surface of dielectric plate 41. Each end of the resistance wire 10 is coupled to a variable impedance unit 13 or 14, and these units are in turn coupled together and to ground at 15 and to one side of voltage source 12. The other side of voltage source 12 is coupled to capacitor plate 16 capacitively coupled through dielectric 41 to the resistor 10. Thus it will be appreciated that resistance wire 10 of FIG. 7 corresponds to resistor 10 of FIG. 3, and similarly for plate 16 and variable impedance units 13, 14. This entire subassembly therefore comprises a scanning circuit A wherein a maximum voltage is caused to traverse the resistor 10 in accordance with the values of variable impedance units 13 and 14 as may be controlled by input signals thereto.

In addition, there is provided an electroluminescent panel 20 having a transparent conductor plate 40 overlying one surface thereof. The opposite surface of electroluminescent panel 20 is superposed on the grid portions 10a, 10b, and 10c of resistor 10, while the transparent conductor 40 may be conveniently grounded. Thus, by choosing a proper value for the output of voltage source 12, only the area of the maximum voltage on resistance wire 10 exceeds the threshold voltage of electroluminescent panel 20, and causes a light spot thereat. This light spot is caused to traverse the resistance wire 10 by applying appropriate input signals to vary the values of variable impedance units 13 and 14, and thus effect a desired pattern of scan, constrained however to the configuration applied to resistance wire 10.

As one exemplary pattern of scan, a combined sawtooth and step function can be applied to units 13 and 14 so as to cause the maximum voltage point or scanning spot first to traverse the resistor section 10a relatively slowly, from right to left as shown in FIG. 7, and then to traverse the following section of the resistance wire 10 extending around the back of panel 42 relatively rapidly (corresponding to a fly-back time), then again relatively slowly to traverse the resistor section 10b from right to left, then rapidly to traverse the following section of resistance wire 10 around the back of panel 42, then again relatively slowly to traverse the resistor section 10c from right to left. By this mode of operation there is effected a line by line scan corresponding to the resistor grid sections 10a, 10b, and 10c. If desired, luminance intelligence may be applied to the scanning spot by modulating the voltage output of source 12, in the same manner as suggested for the preceding embodiments.

With each of the above-described scanning spot assemblies or scanning spot generators, it is understood that for any pattern of scan employed, it is contemplated that where desired the scan field or frame may be repeated repetitively. For this purpose, a switch or gating device (not shown) may be employed where necessary with the voltage sources 12, synchronized with or controlled by the input signals applied to the variable impedance units 13, 14, to cut off application of voltages to the scanning grids during the time that the variable impedance units 13, 14 are returned to their field of scan starting values. Where necessary a similar technique may obviously be employed for what would correspond to the fly-back time on each horizontal line of scan. Also, although in the present specification and claims the scanning aspect is referred to as a scanning light spot, and although in operation as principally contemplated, this scanning spot would actually be a small light spot, it is nevertheless intended by this term to include a larger light area as the "light spot" having a small area of maximum intensity, and further it contemplates the presence of no actual light spot at all, but merely an area or spot particularly close to the threshold value of the electroluminescent panel, so that modulation of the sources 12 might include variations extending above and below the threshold value of the electroluminescent panel. It is also desired to point out that, although in each of the described embodiments of scanning spot assemblies or generators three lines of scan are illustrated, this is merely for the purpose of illustration, and any number of lines of scan, one or more, may be employed as desired. If interlaced fields of scan are desired, it is apparent that this may be readily accomplished by use of interlaced grids and appropriate switching devices or circuits between the interlaced grids and their corresponding scanning circuits.

It has been suggested hereinabove that luminance intelligence may be introduced by modulation of the outputs of the voltage sources 12. However, this approach is not preferred, first because increasing spot intensities in this manner also tend to enlarge the area of the spot, and second, because a rather high frequency for sources 12 is required relative to the frequency of the modulation signal. A preferred system for obtaining intensity intelligence is shown in FIG. 8. Any one of the above-described scanning spot generators is indicated schematically by the block 50. Light amplifier 60 is combined with this generator, and comprises the superposed plates 62 of photoconductive material and 63 of electroluminescent material sandwiching therebetween an opaque dielectric plate 66, this assembly in turn being sandwiched between the two transparent conductive plates 61 and 64. The transparent conductive plates may be, for example, glass plates having transparent conductive coatings on their surfaces contacting the photoconductive and electroluminescent plates 62 and 63.

When scanning spot generator 50 and light amplifier 60 are assembled in juxtaposition, the scanning light spot output of generator 50 plays upon and scans the photoconductive plate 62 through the transparent plate 61. Simultaneously, and synchronized therewith, a voltage signal having a value varying in accordance with the intended luminance intelligence, functionally indicated by the box 65, is applied to the two transparent conductive plates 61 and 64 across the photoconductive and electroluminescent plates 62 and 63. The parameters of light amplifier 60 and the maximum voltage output of the luminance intelligence source 65 are chosen so that for any area where the photoconductor 62 is not illuminated and hence is of high resistance, the voltage drop from source 65 across the electroluminescent plate 63 is below its threshold value. At the same time, these parameters are further chosen so that in the area instantaneously illuminated by the light spot output of generator 50, and hence of a lower resistance, the voltage drop from source 65 across the electroluminescent plate 63 exceeds the threshold value thereof when the luminance intelligence signal is of a value to require a light output. Thus the intensity of this light output becomes a function of the luminance intelligence signal from source 65. Accordingly, as generator 50 scans light amplifier 60, the light output of amplifier 60 provides a luminance intelligence display in spatial array corresponding to the spatial pattern and time base of the scan developed by generator 50. Due to phosphor and visual retentivity, the time base of the scan pattern can be made rapid enough to enable a complete display of entire fields of scan.

It should be noted that the opaque dielectric interposed between the photoconductor 62 and electroluminescent plate 63 prevents feedback of the light output of the electroluminescent plate 63 to the photoconductive plate 62.

Where desired, the electroluminescent plates of either the described scanning spot generators or light amplifier, as well as the photoconductive plate of the light amplifier, may be made in the form of mosaics.

In FIGS. 4–8, the display panel is indicated as a solid state electroluminescent panel. It is apparent that the commutating effects of the present invention can be similarly applied to other display panel media, as for example to display panels comprised of arrays of other voltage responsive light emitting devices, such as gaseous discharge tubes, and to voltage and/or current responsive recording meda, as will be readily apparent to those skilled in the art.

It has been previously mentioned herein that the impedance networks of FIGS. 1–3 can be utilized for general commutating and gating functions, and this is illustrated in FIGS. 9 and 10.

For general gating circuit purposes, in FIG. 9 the impedance networks of FIGS. 1–3 are represented in a D.C. energized circuit wherein the same numerals have been applied to corresponding parts, and accordingly further description of these elements need not be repeated. To the network has been added the tap 70 connected to resistor 10, and this tap may if desired be a variable tap movable along the resistor 10 to the various junctions between resistor 10 and the distributed resistors 11. Tap 70 is coupled to the control element of an electronic valve device 71, which may be a vacuum tube, a gaseous discharge tube, or a transistor, as desired. This circuit may thus function as a variable gate as follows. Impedance devices 13, 14 may be varied in impedance values in accordance with two inputs thereto, either mechanical or electrical, as previously explained. Variations in these inputs cause the maximum voltage point on resistor 10 to vary in position in accordance with the relative values of the impedances of devices 13 and 14. Tube 71 may be biased to operate or respond appropriately only when a desired voltage maximum on resistor 10 is located at the point contacted by tap 70. Thus, tube 71 will respond to the existence of a prescribed relation between the inputs to 13 and 14. The particular relationship between said inputs to which tube 71 will respond can be varied by changing the location of tap 70 on resistor 10, particularly by selecting which junction of resistor 10 and the several distributed resistors 11 is contacted by tap 70. Thus, the impedance networks of FIGS. 1–3 can function in the general application of gating circuits.

For general commutating circuit purposes, in FIG. 10 the impedance networks of FIGS. 1–3 are again represented in a D.C. energized circuit, and as in FIG. 9 the same numerals have been applied to corresponding parts. Accordingly further description of these corresponding elements need not be had. In FIG. 10, to the impedance networks of FIGS. 1–3 there is added a plurality of electronic valve devices such as vacuum tubes 84, 85, and 86, or gaseous discharge tubes or transistors as desired, having their respective control grids or control elements coupled to resistor 10 at points 81, 82, and 83. Points 81, 82, and 83 are junctions between resistor 10 and distributed resistors 11. In accordance with the previous description of the impedance network, as one or both of the variable impedance devices 13, 14 are varied, the voltage maximum point on resistor 10 is caused to vary in location along the length of resistor 10. Thus, by appropriate control of the variable impedance devices 13, 14, as by either a mechanical or electrical input thereto, the voltage maximum on resistor 10 may be caused to traverse the junctions 81, 82, and 83 successively (or other desired order), causing tubes 84, 85, and 86 to be triggered or operated successively. In this manner energization of desired circuits respectively associated with the tubes 84–86 may be commutated by the impedance networks of FIGS. 1–3, and these networks can thus be used for general commutating functions.

Having thus described several specific embodiments of impedance networks for obtaining electrical spatial displacements related to electrical or other input functions, scanning spot generators employing such devices, a luminance intelligence display device employing such scanning spot generators, and general gating and commutating circuits employing said impedance networks, it is understood that these embodiments are intended merely as exemplary of the present invention, and it is not intended that the invention be considered as limited to the specific uses and details herein described. Rather, since other uses and variations and modifications of these embodiments will be readily apparent to those skilled in the art, such changes as are embraced by the spirit and scope of the appended claims are contemplated as within the purview of the present invention.

The present invention is a continuation in part of the copending application of Boris Haskell and George Edlen, S.N. 807,070, filed April 17, 1959.

What is claimed is:

1. A display panel for presentation of electrical information in luminance form comprising an electroluminescent plate sandwiched between a pair of grids, each grid comprising a plurality of parallel electrical conductors, the conductors of one grid being oriented to lie at an angle to the orientation of the conductors of the other grid to provide a plurality of points of intersection between the conductors of one grid and the conductors of the other grid, a scanning circuit for each grid comprising an elongate impedance element, means coupling one side of a voltage source to said element in distributed fashion along the length of said element, means coupling both ends of said element to the other side of said voltage source, said circuit further including means effective as a variable impedance in electrical series circuit with said element for varying the location of the effective impedance midpoint of said effective series circuit, the scanning circuits being connected to provide a maximum voltage at the effective impedance midpoint of one scanning circuit, and a minimum voltage at said effective impedance midpoint of the other scanning circuit, and the conductors of one grid being coupled to spaced points along the length of the impedance element of one scanning circuit and the conductors of the other grid being coupled to spaced points along the length of the impedance element of the other scanning circuit.

2. A display panel for presentation of electrical information in luminance form, comprising: an electroluminescent plate; a horizontal scanning circuit therefor; and a vertical scanning circuit therefor; each scanning circuit including an elongate impedance element, means for coupling one side of a voltage source to said element in distributed fashion along the length of said element, means for coupling both ends of said element to the other side of said voltage source, said circuit further including means effective as a variable impedance in electrical series circuit with said element for varying the location of the effective impedance midpoint of said effective series circuit; said horizontal scanning circuit further including a grid having a plurality of parallel conductive elements vertically oriented over one face of said electroluminescent plate and coupled to spaced points along the length of said impedance element of the horizontal scanning circuit; and said vertical scanning circuit further including a grid having a plurality of parallel conductive elements horizontally oriented over the other face of said electroluminescent plate and coupled to spaced points along the length of said impedance element of the vertical scanning circuit.

3. In combination, an electroluminescent plate, and a scanning circuit therefor, said scanning circuit comprising an elongate impedance element, means for coupling one side of a voltage source to said element in distributed fashion along the length of said element, means for coupling both ends of said element to the other side of said voltage source, said circuit further including means for varying the location of the effective impedance midpoint of the scanning circuit, said element being coupled in distributed fashion with said electroluminescent plate with spaced points along said element coupled to spaced areas on one surface of said plate, and means coupled to the other surface of said plate providing an electrical circuit for the application of the voltage values on said element across said plate in areas to which said element is coupled.

4. In the combination as set forth in claim 3, a light amplifier panel positioned to amplify the light output of said electroluminescent plate.

5. In the combination as set forth in claim 3, said distributed coupling between said element and said electroluminescent plate being effected by means of a first grid having a plurality of electrical conductors oriented in parallel relationship over said one surface of said plate and coupled to said spaced points along said element, and said means coupled to said other surface of said plate comprising a second grid having a plurality of electrical conductors oriented in parallel relationship over said other surface of said plate and at an angle to the orientation of the conductors of the first grid, and a second scanning circuit comprising an elongate impedance element, means for coupling one side of a voltage source to said last-named element in distributed fashion along the length thereof, means for coupling both ends of said last-named element to the other side of the voltage source therefor, and said second scanning circuit further including means for varying the location of the effective impedance midpoint of the second scanning circuit, said conductors of said second grid being coupled to spaced points along said last-named element.

6. In the combination as set forth in claim 5, a light amplifier panel positioned to amplify the light output of said electroluminescent panel.

7. In the combination as set forth in claim 3, said elongate impedance element comprising a plurality of elongate impedance units connected in electrical parallel relationship, said element being coupled to said electroluminescent plate by being continuously coupled to said plate along the length of said element forming a grid of parallel impedance units on said one surface of said plate, and said means coupled to said other surface of said plate comprising a second grid having a plurality of electrical conductors oriented in parallel relationship to each other and to the impedance units forming the first-stated grid, and a second scanning circuit comprising an elongate impedance element, means for coupling one side of a voltage source to said last-mentioned element in distributed fashion along the length thereof, means for coupling the ends of said last-named element to the other side of the voltage source therefor, and said second scanning circuit further including means for varying the location of the effective impedance midpoint of the second scanning circuit, said conductors of said second grid being coupled to spaced points along said last-named element.

8. In the combination as set forth in claim 7, a light amplifier panel positioned to amplify the light output of said electroluminescent plate.

9. In the combination as set forth in claim 3, said elongate impedance element comprising a plurality of elongate impedance units connected in electrical parallel relationship, said element being coupled to said electroluminescent plate by being continuously coupled to said plate along the length of said element forming a first grid of parallel oriented impedance units on said one surface of said plate, and said means coupled to said other surface of said plate comprising a plurality of elongate impedance units connected in electrical parallel relationship forming a second impedance element, said second element being coupled with said plate by being continuously coupled to said other side of said plate along the length of said second element to form a second grid, said impedance units of said second element being oriented in parallel relationship to each other and lying at an angle to said impedance units of said first grid, means for coupling one side of a voltage source to said second element in distributed fashion along the length thereof, means for coupling both ends of said second element to the other side of the voltage source therefor, and means for varying the location of the effective impedance midpoint of said means coupled to said other surface of said plate.

10. In the combination as set forth in claim 9, a light amplifier panel positioned to amplify the light output of said electroluminescent plate.

11. In the combination as set forth in claim 3, said elongate impedance element being formed as a continous element and arranged to describe a plurality of substantially parallel lines over said one surface of said electroluminescent plate, and said means coupled to said other surface of said electroluminescent plate comprising a conductor overlying the areas of said plate corresponding at least to that of said substantially parallel lines.

12. In the combination as set forth in claim 11, a light amplifier panel positioned to amplify the light output of said electroluminescent plate.

13. In a display panel for presentation of electrical information in luminance form; a scanning circuit comprising an elongate impedance element, a voltage source, means coupling one side of said source to said element in distributed fashion along the length thereof, both ends of said element being coupled to the other side of said source, and means for varying the location of the effective impedance midpoint of the scanning circuit; and an electroluminescent panel; said element being coupled to one surface of said panel in distributed fashion, with spaced points along said element being coupled to spaced areas on said surface of said panel.

14. In a display panel as set forth in claim 13, said element being coupled to said one surface of said panel in distributed fashion by means of a grid of substantially parallel spaced conductors applied to said one surface of said panel and being coupled to spaced points along the length of said element.

15. In a display panel as set forth in claim 13, said element comprising a plurality of elongate impedance units connected in electrical parallel relationship and oriented in substantially parallel spaced relationship, and being coupled to said one surface of said panel in distributed fashion by being applied thereto with said units lying in lengthwise contact with said panel.

16. In a display panel as set forth in claim 13, said element being coupled to said one surface of said panel in distributed fashion by being applied thereto with electrical series portions thereof lying in lengthwise contact with said panel, said portions being oriented in substantially parallel spaced relationship.

17. A network comprising an elongate impedance means, a voltage source, second impedance means for coupling one side of said voltage source to said elongate impedance means in distributed fashion along the length thereof, both ends of said elongate impedance means being coupled to the other side of said source, said network further including means effective as a variable impedance in electrical series circuit with said elongate impedance means for varying the location of the effective impedance midpoint of said effective series circuit, and means for tapping a voltage output from a selected point on said elongate impedance means.

18. A network as set forth in claim 17, wherein said second impedance means is a plurality of electrical parallel resistors.

19. A network as set forth in claim 17, wherein said second impedance means is a capacitive means.

20. A network comprising an elongate impedance means, second impedance means coupled to said elongate impedance means in distributed fashion along the length thereof, means for applying a voltage between said second impedance means and both ends of said elongate impedance means, and means for varying the location of the effective impedance midpoint of the network.

21. An electrically responsive image system comprising a first electroluminescent cell means including an electroluminescent phosphor section sandwiched between two transparent conductive sections, and a photoresponsive impedance element interposed between one of said transparent conductive sections and said phosphor section, means for applying across said conductive sections a variable luminance intelligence signal, and a second electroluminescent cell means for generating a scanning spot of light output, said light output of said second cell means being luminance coupled to said photoresponsive element, whereby said first cell means in momentarily sensitized in successive areas for variable luminescent response in accordance with said intelligence signal and in accordance with the scanning pattern of said light spot output.

22. An electrically responsive image system comprising a scanning means including an electroluminescent cell means for generating a scanning spot of light output in accordance with a predetermined pattern and rate of scan, an image generating screen comprising an additional electroluminescent cell means including an electroluminescent phosphor section sandwiched between two transparent conductive sections and having a photoresponsive impedance element interposed between one of said transparent conductive sections and said phosphor section, means for applying across said conductive sections a luminance intelligence signal variable in accordance with preestablished intelligence information and synchronized in time with said predetermined pattern and rate of scan, said light output of said scanning means being optically coupled to said photoresponsive element, whereby said screen is momentarily sensitized in successive areas in accordance with the scanning pattern of said light spot output for variable luminescent response in accordance with said intelligence signals.

23. An electrically responsive image system as set forth in claim 22, wherein said pattern of scan comprises a plurality of successive parallel lines across the area of said screen.

24. A network comprising an elongate impedance means, second impedance means for coupling one side of a voltage source to said elongate impedance means in distributed fashion along the length thereof, means for coupling both ends of said elongate impedance means to the other side of said voltage source, and means for varying the location of the effective impedance midpoint of the network.

25. A network as set forth in claim 24, and further including a voltage source having one side coupled to said second impedance means and the other side coupled to the means for coupling the two ends of said elongate impedance means to the voltage source.

26. A system for presentation of electrical information comprising a pair of grids, each grid being formed of a plurality of substantially parallel conductors, the conductors of one grid being oriented to lie at an angle to the orientation of the conductors of the other grid to provide a plurality of points of intersection between the conductors of one grid and the conductors of the other grid, a scanning circuit for each grid comprising an elongate impedance element, impedance means for coupling one side of a voltage source to said element in distributed fashion along the length of said element, means for coupling both ends of said element to the other side of said voltage source, and means effective as a variable impedance in the scanning circuit for varying the effective impedance midpoint of the scanning circuit, the scanning circuits being connected to provide when energized from a voltage source a maximum voltage at the effective impedance midpoint of one scanning circuit, and a minimum voltage at the effective impedance midpoint of the other scanning circuit, and the conductors of one grid being coupled to spaced points along the length of said impedance element of one scanning circuit and the conductors of the other grid being coupled to spaced points along the length of said impedance element of the other scanning circuit, and means sandwiched between said two grids responsive to electrical signals thereon for transducing such signals into a presentation form.

27. A system as set forth in claim 26, wherein said means effective as a variable impedance includes means interposed between an end of said elongate impedance element and the second mentioned coupling means.

28. A system as set forth in claim 26, wherein said means effective as a variable impedance includes means interposed between each of the ends of said elongate impedance element and said second mentioned coupling means.

29. A network comprising elongate impedance means, second impedance means for coupling one side of a voltage source to said elongate impedance means in distributed fashion along the length thereof, and means for coupling both ends of said elongate impedance means to the other side of said voltage source.

30. An electrically responsive display system comprising, an electroluminescent cell means for generating a scanning spot of light output in accordance with a predetermined pattern and rate of scan, a display screen comprising an electrical signal responsive light amplifier optically coupled to said scanning spot of light output, and means for applying to said light amplifier a luminance intelligence electrical signal variable in accordance with determined display information and synchronized in time with said predetermined pattern and rate of scan, whereby each momentary light output of said scanning spot of light generator is amplified by said light amplifier in accordance with the momentary value of the luminance intelligence electrical signal.

31. A network comprising an elongate impedance means, second impedance means for coupling one side of a voltage source to said elongate impedance means in distributed fashion along the length thereof, means for coupling both ends of said elongate impedance means to the other side of said voltage source, means for varying the location of the effective impedance midpoint of the network, and a tap coupled to said elongate impedance means.

32. A network as set forth in claim 31, wherein said tap is a variable tap movable along the length of said elongate impedance means.

33. A network as set forth in claim 31, wherein the effective impedance midpoint varying means comprises two means effective as variable impedances, one interposed between each end of said elongate impedance means and the second mentioned coupling means.

34. A network as set forth in claim 31, wherein said tap is further coupled to an electrical circuit control element.

35. A network as set forth in claim 31, having a plurality of taps coupled to spaced points along the length of said elongate impedance means.

36. A network as set forth in claim 35, wherein each tap is further coupled to a respective electrical circuit control element.

37. An electrically responsive display system comprising: means for producing a scanning spot of light output of substantially constant luminance scanning an area in accordance with a predetermined pattern and rate of scan; a display screen comprising an electro-optical converter having light and electrical energy responsive means optically coupled to said scanning spot of light output; and means for applying to said converter an electrical signal variable in accordance with determined intelligence and synchronized with said predetermined pattern and rate of scan; whereby momentary light outputs of said scanning spot of light means and responsive momentary values of the electrical intelligence signal are combined by said converter to produce a spatial presentation of the intelligence in said electrical intelligence signal.

38. A display system as set forth in claim 37, wherein said scanning spot of light means is an electroluminescent cell means.

39. A display system as set forth in claim 37, wherein said converter is a combined electroluminescent and photoconductive cell means.

40. A display system as set forth in claim 39, wherein said scanning spot of light means is an electroluminescent cell means.

41. A method of producing a spatial presentation of intelligence presented as a time based electrical signal, comprising scanning an electro-optical converter panel having light and electrical energy responsive means with a spot of light of substantially constant intensity in accordance with a predetermined pattern and rate of scan, applying a time based electrical intelligence signal to said converter, and synchronizing said electrical intelligence signal and said pattern and rate of scan relative to each other to provide a spatially arranged presentation output from said converter representative of the intelligence contained in said electrical intelligence signal.

References Cited in the file of this patent
UNITED STATES PATENTS

| | | |
|---|---|---|
| 2,928,980 | Williams | Mar. 15, 1960 |
| 2,932,746 | Jay | Apr. 12, 1960 |